| United States Patent [19] | [11] Patent Number: 4,720,513 |
| Kameyama et al. | [45] Date of Patent: Jan. 19, 1988 |

[54] ADHESIVE COMPOSITION COMPRISING A CYANOACRYLATE COMPOUND WITH A SILYL ISOCYANATE TREATED SILICA GEL

[75] Inventors: Makoto Kameyama, Chiba; Masakazu Wakabayashi, Sakura; Iwakichi Sugiyama, Narashino, all of Japan

[73] Assignee: Matsumoto Seiyaku Kogyo Kabushiki Kaisha, Ichikawa, Japan

[21] Appl. No.: 46,392

[22] Filed: May 4, 1987

[30] Foreign Application Priority Data

May 7, 1986 [JP] Japan .............................. 61-104191

[51] Int. Cl.$^4$ ........................... C08K 9/06; C08K 3/36
[52] U.S. Cl. .................................... 523/203; 523/212; 523/213; 524/493; 524/806; 524/838
[58] Field of Search ................. 523/203, 213, 212; 524/806, 838, 493

[56] References Cited

U.S. PATENT DOCUMENTS

| 4,477,607 | 10/1984 | Litke | 523/212 |
| 4,533,422 | 8/1985 | Litke | 523/212 |

FOREIGN PATENT DOCUMENTS

| 0043247 | 4/1979 | Japan . |
| 0107993 | 8/1979 | Japan . |

*Primary Examiner*—Herbert J. Lilling
*Attorney, Agent, or Firm*—Ladas & Parry

[57] ABSTRACT

The present invention relates to an instantaneous adhesive composition which is satisfactorily made thixotropic or gelled and has a rapid setting time and an excellent adhesive strength, said composition being obtained by adding to an α-cyanoacrylate a silica gel treated with a silyl isocyanate.

5 Claims, No Drawings

ADHESIVE COMPOSITION COMPRISING A CYANOACRYLATE COMPOUND WITH A SILYL ISOCYANATE TREATED SILICA GEL

BACKGROUND OF THE INVENTION

This invention relates to an α-cyanoacrylate adhesive composition improved in fluidity and physical properties of the cured product, particularly a composition which was made thixotropic or gelled by use of a silica gel treated with an alkylsilyl isocyanate.

An α-cyanoacrylate represented by the formula:

$$CH_2=C-COOR^1$$
$$\phantom{CH_2=}|$$
$$\phantom{CH_2=}CN$$

(wherein $R^1$ is alkyl, aryl, alkenyl, aralkyl, haloalkyl, alkoxyalkyl having 1 to 18 carbon atoms, etc.) polymerizes within a short time with moisture or an anionic material to bond various materials firmly and is therefore used as an instantaneous adhesive, as is well known in the art.

This α-cyanoacrylate adhesive is characterized in that it is readily flowable with low viscosity, having the property of being easily used for penetration adhesion or automatic coating.

However, on the other hand, it readily splashes out from a vessel, thereby sometimes causing accidents during handling. This has been an obstacle in its practical application, and there has been a great need for its improvement.

As methods for meeting this need, a method in which viscosity is increased by use of a thickener and a method in which the adhesive is made thixotropic or gelled by use of various plastic fluidizing agents have been proposed.

For example, Japanese Laid-Open Patent Publication No. 43247/1979 discloses an adhesive thickened by use of a colloidal inorganic compound, particularly ultra-fine silica in α-cyanoacrylate, and also Japanese Laid-Open Patent Publication No. 107993/1979 proposes an adhesive composition produced by use of an inorganic or organic plastic fluidizing agent including silicon dioxide in α-cyanoacrylate. Otherwise, in U.S. Pat. Nos. 4,477,607 and 4,533,422, an α-cyanoacrylate adhesive composition comprising use of a silica gel, particularly a fumed silica modified with polydimethylsiloxane or trialkoxyalkylsilane is disclosed.

In the above Japanese Laid-Open Patent Publication No. 43247/1979, as can be seen also from the description in its specification that it is necessary to exercise care regarding acidity and dryness in preparation of its adhesive, when employing the above ultra-fine silica, namely, fumed silica, there appears retardation in the curing speed caused by its silicic acid behavior, which is a vital defect as an instantaneous adhesive. Also, according to Japanese Laid-Open Patent Publication No. 107993/1979, although a composition having good liquid properties can be obtained, the water resistance behavior of the cured product is not satisfactory.

According to the above two U.S. patent inventions, an adhesive improved to some extent in thixotropic, gelled performance and water resistance behavior of the cured product is obtained. However, when silica gel or fumed silica is treated with polydimethylsioxane or trialkoxyalkylsilane, the reaction does not proceed unless an acid is used as a catalyst, and also even if an acid is used as the catalyst, the hydrolysis reaction of the silicate moiety is liable to become nonuniform, whereby deviations are liable to occur in the treatment working of silica gel, thus entailing unsatisfactorily lack of reproducibility and stability of the physical properties of the product.

SUMMARY OF THE INVENTION

Accordingly, we have carried out various studies in order to provide an adhesive composition which is made thixotropic or gelled by obtaining a silica gel of enriched reproducibility and stability among its physical properties or a treatment method and adding this to a cyanoacrylate, and consequently found that a silica gel treated with a silyl isocyanate can produce uniform and stable quality, and when this silica gel is added to an α-cyanoacrylate, an adhesive composition capable of producing a cured product having desirable plastic fluidity and good water resistance behavior can be obtained. Thus the present invention has been achieved.

Accordingly, the present invention provides an adhesive composition which is made thixotropic or gelled by adding a silica gel treated with a silyl isocyanate to an α-cyanoacrylate.

DETAILED DESCRIPTION OF THE INVENTION

To describe the present invention in detail, the silyl isocyanate to be used in the present invention is preferably an alkyl, aryl or alkenyl-silyl isocyanate compound represented by the formula:

$$R_nSi(NCO)_{4-n}$$

(wherein R represents a $C_1$–$C_{18}$ alkyl, aryl or alkenyl, and n is an integer of 1 to 3), including, for example, trimethylsilyl monoisocyanate, triethylsilyl monoisocyanate, dimethylphenylsilyl monoisocyanate, dimethyl t-butylsilyl monoisocyanate, dimethylsilyl diisocyanate, methylphenylsilyl diisocyanate, methylsilyl triisocyanate, vinylsilyl triisocyanate, phenylsilyl triisocyanate, octadecylsilyl triisocyanate and the like.

A silica gel, for example, fumed silica, is treated with such silyl isocyanate to obtain a modified silica gel, and a silyl isocyanate is generally used in an amount of equal mol or more relative to the silica gel. For the treatment, a low boiling organic solvent having no active hydrogen such as hydrocarbons, halogenated hydrocarbons, esters, ethers, ketones is generally used either singly or as a mixture, but no catalyst is used. The reaction is carried out at room temperature or in a temperature range around the boiling point of the solvent, and can proceed easily. The treated silica gel may be used after removal of the solvent or excessive silyl isocyanate under atmospheric pressure or reduced pressure, but if desired, they can be also removed after addition into a cyanoacrylate.

The amount of the modified silica gel added based on the cyanoacrylate may be selected depending on the liquid properties to be expected, but 4 to 6 parts of the modified silica gel can be used per 100 parts by weight of cyanoacrylate when it is desired to obtain a sol with slight residual fluidity, while a colorless stable gel-like product will be obtained if prepared with addition of 8 to 10 parts or more of the modified silica gel. The composition obtained produces a sol-like product or gel-like product having thixotropic property corresponding to the amount of the modified silica gel used, having preferably a thixotropic index (JIS K-6901) of 3 or more, and its product becomes hydrophobic due to the effect of RnSi-group, the adhesive layer having excellent water resistance and being easily handled and useful in industry.

In the adhesive composition of the present invention, various additives generally used for cyanoacrylate adhesives as mentioned below can be added in desired amounts, if necessary. For example, it is possible to add 100 to 1,000 ppm of a stabilizer such as $SO_2$, hydroquinone, methoxyhydroquinone or bis[2-(hydroxyethyl)-methacrylate] acid phosphate per 100 parts by weight of cyanoacrylate; 1 to 10 parts of a plasticizer such as dioctyl sebacate, dioctyl phthalate, triethyl citrate; 10 to 5,000 ppm of a dye or a flavor; 1 to 10 parts of a thickener such as polymethyl methacrylate, polyacrylonitrile, polystyrene, acrylonitrile-butadiene-styrene (ABS) resin, acrylonitrile-styrene (AS) resin, polyvinyl ether, polyvinyl chloride, ethyl cellulose, and polybutadiene; 0.1 to 30 parts of an organic thixotropic agent such as polyvalent hydroxy compound-aromatic aldehyde condensate, aromatic hydroxy compound-boric acid semi-polar condensate, aluminum fatty acid salt, hydrogenated castor oil compound, and fatty acid polyamide compound.

Otherwise, it is also possible to add 1 to 50 parts of a solvent such as acetone, methyl ethyl ketone (MEK), tetrahydrofuran (THF), dioxane, chloroform, dichloromethane, trichloroethylene (Triclene), trichlorotrifluoroethane (Freon), n-hexane, toluene, and xylene; 1 to 10 parts of a copolymerizable additive such as mono- or di-acrylate or mono- or di-methacrylate of polyalkylene glycol, pentaerythritol methacrylate, and glycidyl methacrylate; 1 to 100 parts of powder of a metal such as aluminum, copper and silver; a pigment such as carbon black, talc, titanium oxide, and zinc oxide; and 1 to 200 parts of wood powder, powder of Teflon, nylon, ABS, polyvinyl chloride, etc. These various additives may be added previsouly, or they can be added during usage when the stability of the system is poor. When the powders are added previously, they are added after the treatment, if necessary. In the present specification, parts mean parts by weight.

The present invention will be further explained in detail by the following examples.

TREATMENT EXAMPLE 1

A dispersion of 50 parts of fumed silica gel (e.g. trade name Aerosil, Nippon Aerosil Co.) in 500 parts of ethyl acetate was charged into a one-liter flask. To this dispersion were added 20 parts of trimethylsilyl monoisocyanate, and the mixture was stirred at room temperature for 5 minutes then heated and treated at the boiling point of the solvent. After cooling, the product was filtered and dried to obtain a trimethylsilyl-modified silica gel. The amount recovered was 54 parts.

TREATMENT EXAMPLE 2

In Treatment Example 1, treatment was carried out by use of the same amount of monomethylsilyl triisocyanate in place of trimethylsilyl monoisocyanate to obtain a modified silica gel. The amount recovered was 51 parts.

TREATMENT EXAMPLE 3

In Treatment Example 1, treatment was carried out by use of the same amount of monobutylsilyl triisocyanate in place of trimethylsilyl monoisocyanate to obtain a modified silica gel. The amount recovered was 52 parts.

TREATMENT EXAMPLE 4

In Treatment Example 1, treatment was carried out by use of the same amount of monophenylsilyl triisocyanate in place of trimethylsilyl monoisocyanate to obtain a modified silica gel. The amount recovered was 53 parts.

TREATMENT EXAMPLE 5

In Treatment Example 1, treatment was carried out by use of the same amount of monovinylsilyl triisocyanate in place of trimethylsilyl monoisocyanate to obtain a modified silica gel. The amount recovered was 53 parts.

EXAMPLE 1

To 100 parts of α-cyanoethylacrylate containing $SO_2$ and hydroquinone as the stabilizers were added 3 parts of dioctylsebacate and 6 parts of the modified silica gel of Treatment Example 1, and the treatment was carried out in a ball mill for 2 hours to obtain a colorless sol-like product with a thixotropic index of 3.8.

EXAMPLE 2

To 100 parts of α-cyanoethylacrylate containing $SO_2$ and hydroquinone as the stabilizers and adjusted to 50 cps at 25° C. with addition of a polymethyl methacrylate as the thickener were added 2 parts of dioctyl phthalate and 6 parts of the modified silica gel obtained in Treatment Example 2, and the treatment was carried out in a ball mill for 2 hours to obtain a colorless gel-like product with a thixotropic index of 4.2.

EXAMPLE 3

To 100 parts of α-cyanomethylacrylate containing $SO_2$ and hydroquinone as the stabilizers were added 2 parts of triethyl citrate and 6 parts of the modified silica gel obtained in Treatment Example 3, and the treatment was carried out in a ball mill for 2 hours to obtain a colorless sol-like product.

EXAMPLE 4

To 100 parts of α-cyanoethoxyethylacrylate containing $SO_2$ and hydroquinone as the stabilizers, 8 parts of the modified silica gel obtained in Treatment Example 4 were added, and the treatment was carried out in a ball mill for 2 hours to obtain a colorless gel-like product with a thixotropic index of 4.5.

EXAMPLE 5

To 100 parts of α-cyanoethylacrylate containing bis[(2-hydroxyethyl)methacrylate] acid phosphate and methoxyhydroquinone as a stabilizers were added 5 parts of triethylene glycol dimethacrylate and 6 parts of the modified silica gel obtained in Treatment Example 5, and the treatment was carried out in a ball mill for 2 hours to obtain a colorless gel-like product.

EXAMPLE 6

To 100 parts by weight of α-cyanoethylacrylate containing $SO_2$ and hydroquinone as the stabilizers were added 2 parts of dioctyl phthalate, 6 parts of the modified silica gel obtained in Treatment Example 1 and 20 parts of Teflon powder, and the treatment was carried out in a ball mill for 2 hours to obtain a white paste-like product with a thixotropic index of 4.5.

EXAMPLE 7

To 100 parts by weight of α-cyanoethylacrylate containing $SO_2$ and hydroquinone as the stabilizers were added 2 parts of a polymethyl methacrylate, 3 parts of a hydrogenated castor oil, 10 parts of THF and 6 parts of the modified silica gel obtained in Treatment Example 1, and the treatment was carried out in a ball mill for 2 hours to obtain a sol-like product with a thixotropic index of 2.7.

EXAMPLE 8

To 100 parts by weight of α-cyanoethylacrylate containing $SO_2$ and hydroquinone as the stabilizers were added 2 parts of triethyl citrate, 6 parts of the modified silica gel obtained in Treatment Example 1 and 100 parts of silver powder, and the treatment was carried out in a ball mill for 2 hours to obtain a gray paste-like product.

EXAMPLE 9

To 100 parts by weight of α-cyanoethylacrylate containing $SO_2$ and hydroquinone as the stabilizers were added 2 parts of dioctyl phthalate, 4 parts of the modified silica gel obtained in Treatment Example 1 and 50 parts of titanium oxide, and the treatment was carried out in a ball mill for 2 hours to obtain a white paste.

EXAMPLE 10

To 100 parts by weight of the composition obtained in Example 1, 20 parts of powder of hinoki (Japanese cypress) were added, followed by mixing for 5 minutes to obtain a paste-like product.

TEST EXAMPLE 1

Performance tests of the products of Example 1 and Example 2 were conducted according to JIS K6861. The results were as shown in the following Table 1.

TABLE 1

|  | Example 1 | Example 2 |
| --- | --- | --- |
| Setting time: |  |  |
| Mild steel | 40~50 sec. | 30~40 sec. |
| Birch | 60~80 sec. | 50~60 sec. |
| Polyvinylchloride | 20~30 sec. | 20~30 sec. |
| Adhesion strength: Mild steel | 255 Kg/cm² | 285 Kg/cm² |
| Storage stability | Good | Good |
| Thermal stability*¹ | Restorable | Restorable |

TABLE 1-continued

|  | Example 1 | Example 2 |
| --- | --- | --- |
| Freezing resistance*² | Restorable | Restorable |

*¹Liquid property when cooled to room temperature after heating at 70° C. for 1 hour.
*²Liquid property when returned to room temperature after treatment at −10° C. for 1 hour.

TEST EXAMPLE 2

For the products of Examples 3 to 10, performance tests were conducted in the same manner as in Test Example 1. However, the setting time was conducted only for polyvinyl chloride. The results are shown in the following Table 2.

TABLE 2

|  | Setting time PVC (sec) | Adhesion strength mild steel (kg/cm²) | Storage stability | Thermal*¹ stability | Freezing*² resistance |
| --- | --- | --- | --- | --- | --- |
| Example 3 | 20–30 | 268 | Good | Restorable | Restorable |
| Example 4 | 40–60 | 173 | Good | Restorable | Restorable |
| Example 5 | 30–40 | 285 | Good | Restorable | Restorable |
| Example 6 | 20–30 | 256 | Good | Restorable | Restorable |
| Example 7 | 20–30 | 232 | Good | Restorable | Restorable |
| Example 8 | 20–30 | 186 | Hardened in one day | — | — |
| Example 9 | 30–40 | 236 | Good | Restorable | Restorable |
| Example 10 | 10–20 | 260 | Immediately hardened | — | — |

*¹Liquid property when cooled to room temperature after heating at 70° C. for 1 hour.
*²Liquid property when returned to room temperature after treatment at −10° C. for 1 hour.

TEST EXAMPLE 3

By varying the amount of the modified silica gel of Treatment Example 1 used in Example 1, the thixotropic indices of the respective products were measured. The results are shown in the following Table 3.

TABLE 3

| No. | α-cyano-ethylacrylate (containing $SO_2$, hydroquinone) (part) | Modified silica gel of Treatment Example 1 (part) | Thixotropic Index |
| --- | --- | --- | --- |
| 1 | 100 | 1 | 1.8 |
| 2 | 100 | 3 | 2.6 |
| 3 | 100 | 5 | 3.2 |
| 4 | 100 | 8 | 5.6 |

TEST EXAMPLE 4

For comparison, in place of "the modified silica gel of Treatment Example 1", fumed silica (Aerosil 200, Nippon Aerosil Co.) was treated by drying at 200° C. for 1 hour and used as such in the preparation.

The performance tests of the composition obtained were conducted in the same manner as in Test Example 1. The results are shown in the following Table.

TABLE 4

| Setting time: |  |
| --- | --- |
| Mild steel | 1~2 min. |
| Birch | 2~3 min. |
| Polyvinyl chloride | 40~60 sec. |
| Adhesion strength: Mild steel | 170 Kg/cm² |
| Storage stability | Good |
| Thermal stability | Restorable |
| Freezing resistance | Restorable |

From the above Tables 1, 2 and 4, it is evident that an α-cyanoacrylate adhesive to which silica gel treated with the silyl isocyanate is added according to the present invention has excellent thixotropic and gelling properties, considerably rapid setting time and high adhesive strength when compared with a prior art isocyanate adhesive to which untreated silica gel is added.

This it is evident that the α-cyanoacrylate adhesvie of the present invention has excellent adhesion property indispensable to an instantaneous adhesive.

As will be apparent from the above description, according to the present invention, since the reaction of silica gel with a silyl isocyanate can proceed easily in the absence of a catalyst at room temperature, whereby the treatment can be conducted with good reproducibility with an organic solvent containing no active hydrogen or by non-solvent, gas-phase treatment, and the effect is also stable.

Furthermore, an adhesive composition comprising such silica gel treated with a silyl isocyanate added to α-cyanoacrylate is satisfactorily made thixotropic or gelled, having rapid setting time for various materials as well as excellent adhesion strength, and is also useful industrially as an α-cyanoacrylate adhesive.

What is claimed is:

1. An adhesive composition, which is made thixotropic or gelled by adding a silica gel treated with a silyl isocyanate to an α-cyanoacrylate.

2. A composition according to claim 1, wherein the α-cyanoacrylate has the following formula:

$$CH_2=C-COOR^1$$
$$|$$
$$CN$$

(wherein $R^1$ is a group selected from the group consisting of alkyl, aryl, alkenyl, aralkyl, haloalkyl and alkoxyalkyl having 1 to 18 carbon atoms).

3. A composition according to claim 1, wherein the silyl isocyanate is a compound having the following formula:

$$R_nSi(NCO)_{4-n}$$

(wherein R is a group selected form the group consisting of alkyl, aryl and alkenyl having 1 to 18 carbon atoms, and n represents an integer of 1 to 3).

4. A composition according to claim 1, wherein 4 to 6 parts by weight of the silica gel treated with the silyl isocyanate are added per 100 parts by weight of the α-cyanoacrylate.

5. A composition according to claim 1, wherein 8 to 10 parts by weight or more of the silica gel treated with a silyl isocyanate is added per 100 parts by weight of the α-cyanoacrylate.

* * * * *